H. G. KNODERER.
ELECTRICAL FITTING.
APPLICATION FILED OCT. 18, 1920.
1,400,824.
Patented Dec. 20, 1921.
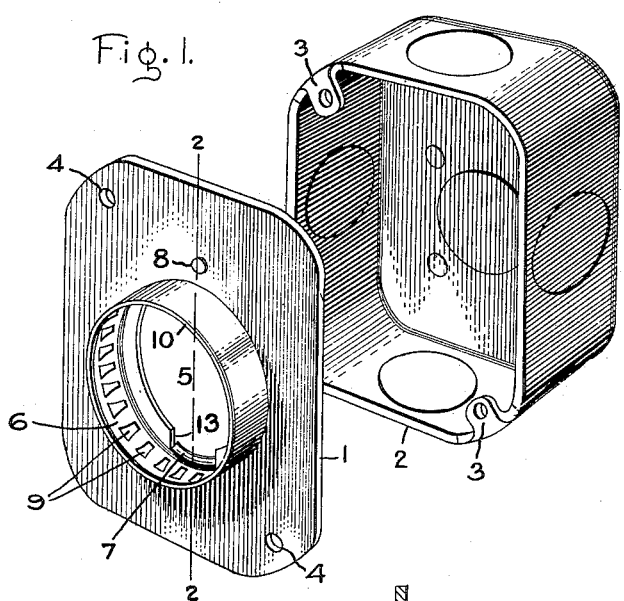
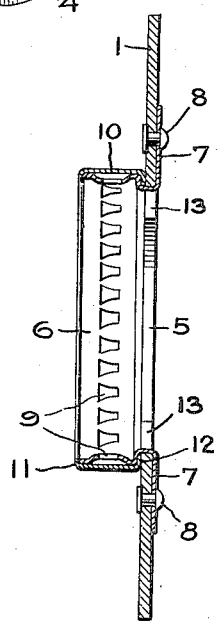
Inventor:
Homer G. Knoderer,
by Albert G. Davis
His Attorney.

UNITED STATES PATENT OFFICE.

HOMER G. KNODERER, OF ENGLEWOOD, NEW JERSEY, ASSIGNOR TO GENERAL ELECTRIC COMPANY, A CORPORATION OF NEW YORK.

ELECTRICAL FITTING.

1,400,824.      Specification of Letters Patent.      Patented Dec. 20, 1921.

Application filed October 18, 1920. Serial No. 417,643.

*To all whom it may concern:*

Be it known that I, HOMER G. KNODERER, a citizen of the United States, residing at Englewood, in the county of Bergen, State of New Jersey, have invented certain new and useful Improvements in Electrical Fittings, of which the following is a specification.

My invention relates to a device for mounting electric fixtures, such as lamp sockets and the like upon conduit bodies or outlet boxes.

An object of my invention is to produce a simple, compact device which shall be rugged and inexpensive to manufacture and which shall insure a good electrical connection between the shell of the fixture and the outlet box whereby the fixture shall be grounded to the conduit system, thereby lessening the danger of shocks to the user.

My invention will be better understood from the following description taken in connection with the accompanying drawing, and its scope will be pointed out in the appended claims.

In the accompanying drawing, Figure 1 is a perspective view showing my device together with an outlet box upon which it may be mounted; and Fig. 2 is a section on the line 2—2 of Fig. 1.

Referring to the drawing, 1 represents an outlet box cover which is adapted to be mounted upon an outlet box 2 which may be provided with lugs 3 arranged to be engaged by screws threaded through the openings 4 of the cover. The cover is provided with an opening 5 for electric conductors leading from the outlet box through the cover. A metallic fixture securing ring member 6 is arranged concentrically with the opening 5. The member 6 is provided with a plurality of reversely bent lugs 7 which are secured to the under side of the cover 1, being firmly held thereagainst in any suitable manner indicated by rivets 8. The ring member 6 is provided with a plurality of openings 9 adapted to engage and support an electric fixture shell, such, for example, as the shell of a lamp socket, in a manner well known in the art. An inclosing ring member 10 is provided to cover the openings in the member 6 and the member 10 is held in place by rims 11 and 12 spun over the upper and lower edges of the ring member 6. The reverse bend in the lugs 7 provides a space for the rim 12 and by this construction the rims 11 and 12 may both be continuous and therefore readily constructed. I prefer to cut away the cover 1 as shown at 13 to provide notches for the lugs 7 in order to reduce the length of these lugs and the amount of material required therefor.

My invention secures a good electrical connection between the conduit system and the fixture engaging and supporting ring 6 and the metal parts of the fixture are thus grounded, thereby lessening the danger of shocks to the user. The inturned rim of the inclosing ring 10 is firmly held against the cover of the box thus providing a rigid mechanical mounting for the fixture engaging and supporting ring.

What I claim as new and desire to secure by Letters Patent of the United States, is:—

1. The combination of a metallic outlet box cover having an opening therein for electric conductors leading from the outlet box through the cover, a metallic ring member provided with means for engaging and supporting an electric fixture shell located on the outside of said cover concentrically with the opening therein, said ring member being provided with a plurality of lugs integral therewith projecting through said opening and secured to the inner side of said cover, whereby the ring member is secured in good mechanical and electrical connection with said cover.

2. The combination of a metallic outlet box cover having an opening therein for electric conductors leading from the outlet box, a metallic ring member provided with a plurality of openings therein adapted to engage and support an electric fixture shell located on the outside of said cover concentrically with the opening therein, said ring member being provided with a plurality of reversely bent lugs integral therewith projecting through said opening and secured against the inner side of said cover, and an inclosing ring for covering the openings in said engaging and supporting ring member, said inclosing ring having a continuous rim at each edge for securing it on said ring member, one rim being held against the outer surface of the cover by said reversely bent lugs.

In witness whereof, I have hereunto set my hand this 15 day of October 1920.

HOMER G. KNODERER.